UNITED STATES PATENT OFFICE.

CHARLES F. DURANT, OF JERSEY CITY, NEW JERSEY.

IMPROVEMENT IN DISSOLVING AND SOFTENING GUTTA-PERCHA AND CAOUTCHOUC.

Specification forming part of Letters Patent No. 5,539, dated April 25, 1848; antedated October 25, 1847.

*To all whom it may concern:*

Be it known that I, CHARLES F. DURANT, of Jersey City, in the county of Hudson and State of New Jersey, have discovered and invented a new and valuable solvent for gutta-percha and rubber, and a new and valuable cement and lute for joining gutta-percha, rubber, and other matter; and I do hereby declare that the following is a full and exact description.

The nature of my discovery and invention consists in the employment of "perchloride of formyle," otherwise known as "chloroform," to dissolve gutta-percha and rubber, separate or combined; and in the employment of said solution to make articles of all forms by running the same into molds, and by coating or spreading the said solution over molds, and by dipping molds into said solution; and in the employment of said solution as a lute or cement to join gutta-percha with gutta-percha, and to join gutta-percha or gutta-percha articles with other matter or other articles; and to join rubber with rubber, and to join rubber or rubber articles with other matter or articles; and in the employment of said solution for covering all articles of every kind by pouring or spreading the solution over the surface intended to be covered, or by dipping the articles into said solution; and in the employment of chloroform, otherwise called "perchloride of formyle," to soften gutta-percha or gutta-percha articles, and to soften rubber and rubber articles, so that the softened parts will adhere and unite when pressed together.

To enable others skilled in the art to make the aforesaid lute or cement and to apply it to the aforementioned uses and purposes, I describe the process, thus:

I cut the matter called "gutta-percha" or "tuban" into small thin pieces and pour on it the perchloride of formyle, otherwise called "chloroform," enough to cover it. The proportions are not material. With a little stirring the solution will be perfect in a few minutes. The process for the rubber is the same, except that only a small portion of the rubber will be dissolved. Molds dipped in the above solution, or wire made to pass through it, will instantly receive a thin coat, which may be increased in thickness by repeated dippings, or by spreading the solution with a soft brush. Each coat will dry in less than three minutes. To shield articles from the action of the atmosphere, one coat is sufficient. When applied as a lute or cement, a soft brush may be used. When the chloroform alone is used to soften the gutta-percha or rubber, I continue the application until the parts are soft enough to unite at the joinings, and then press the seams together.

What I claim as my discovery and invention, and desire to secure by Letters Patent, is—

The application of perchloride of formyle, otherwise known as "chloroform," to soften and to dissolve gutta-percha, and to soften and dissolve rubber.

CHAS. F. DURANT.

Witnesses:
 HORACE H. DAY,
 JAS. NARINE.